United States Patent
Parrish

(10) Patent No.: US 12,380,387 B2
(45) Date of Patent: Aug. 5, 2025

(54) SYSTEMS AND METHODS FOR GENERATING PREDICTIVE RISK OUTCOMES

(71) Applicant: Capital One Services, LLC, McLean, VA (US)

(72) Inventor: Michael Wray Parrish, Chesterfield, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 592 days.

(21) Appl. No.: 17/550,632

(22) Filed: Dec. 14, 2021

(65) Prior Publication Data
US 2023/0186214 A1    Jun. 15, 2023

(51) Int. Cl.
*G06Q 10/0635* (2023.01)
*G06N 20/00* (2019.01)

(52) U.S. Cl.
CPC ......... *G06Q 10/0635* (2013.01); *G06N 20/00* (2019.01)

(58) Field of Classification Search
CPC ..................... G06Q 10/0635; G06N 20/00
See application file for complete search history.

(56) References Cited

U.S. PATENT DOCUMENTS

| | | | |
|---|---|---|---|
| 10,504,028 B1 * | 12/2019 | Jackson | G06N 20/10 |
| 10,769,570 B2 * | 9/2020 | Lu | G06Q 10/0635 |
| 11,901,080 B1 * | 2/2024 | Matt | G06T 7/0012 |
| 2018/0174067 A1 * | 6/2018 | Spiro | G06F 30/20 |
| 2019/0026665 A1 * | 1/2019 | Caskey | H04L 67/535 |
| 2019/0034846 A1 * | 1/2019 | Mo | G06Q 10/0635 |
| 2020/0019903 A1 | 1/2020 | Rashidi et al. | |
| 2020/0134519 A1 | 4/2020 | Rakesh | |
| 2020/0342340 A1 | 10/2020 | Jackson et al. | |
| 2021/0398683 A1 * | 12/2021 | Clifford | A61B 5/1118 |
| 2022/0156655 A1 * | 5/2022 | Barrientos | G06V 10/764 |

* cited by examiner

*Primary Examiner* — Peter D Nolan
*Assistant Examiner* — Matthew Cobb
(74) *Attorney, Agent, or Firm* — TROUTMAN PEPPER LOCKE LLP; Christopher J. Forstner; John A. Morrissett

(57) ABSTRACT

Disclosed embodiments may include a method for generating predictive risk outcomes by receiving data and generating, using a first machine learning model (MLM), associated data. Then generating from the associated data, using a second MLM, correlated and uncorrelated data, which is then filtered to a reduced data set. The reduced data set is then used to generate, using a third MLM, risk event predictions that are output to an interactive graphical user interface (GUI) in a ranked, dynamic index. The system can be adjusted and run in near-real time from the GUI.

9 Claims, 4 Drawing Sheets

SYSTEMS AND METHODS FOR GENERATING PREDICTIVE RISK OUTCOMES

The disclosed technology relates to systems and methods for generating predictive risk outcomes for proactive risk management. Specifically, this disclosed technology relates to ingesting and aggregating input data, reducing the data, and, from the data, determining risk outcomes to predict future risk based on past indicators and trends.

BACKGROUND

Financial risk is a potential threat to businesses everywhere. From the lone credit card thief, to large scale systematic over-complacency, risk can come from a variety of forms. Therefore, businesses have an important need to constantly assess risk and determine factors that can evaluate the business's overall risk, commonly known as risk analysis. Risk management strategies can then be used to make guided business decisions, including whether to take on more risk, or to reduce the amount of risk in a portfolio.

Traditional systems and methods for risk management typically are reactive in nature. Prevailing approaches use relatively static and lagging indicators as risk metrics to measure risk-taking performance against an organization's willingness to take on additional risk. While large amounts of available risk data exists, most of this data is underutilized due to complexity, weakly understood inter-relationships, the manual nature of review, and time constraints.

Accordingly, there is a need for improved systems and methods for recognizing and proactively reporting risk to prevent undertaking unnecessary risk. Embodiments of the present disclosure are directed to this and other considerations.

SUMMARY

Disclosed embodiments may include a system for generating predictive risk outcomes for proactive risk management. The method may include receiving input data comprising event data (by e.g., risk identification system 320). The method may also include generating, using a first machine learning model (MLM), associated data from the input data. For instance, the method may include generating, using a second MLM, correlated data and non-correlated data based on the associated data and the event data. The method may also include generating, using a third MLM, one or more risk event predictions based on the correlated data and non-correlated data. Finally, the method may include sending the one or more risk event predictions to one or more user devices for display; and training the first MLM with the associated data.

Disclosed embodiments may include a system for generating predictive risk outcomes for proactive risk management. The method may include receiving input data comprising event data (by e.g., risk identification system 320). The method may also include generating, using a first MLM, associated data from the input data. For example, the method may include generating, using a second MLM, correlated data and non-correlated data based on the associated data. For example, the method may include generating, using a third MLM, one or more risk event predictions based on the correlated data and non-correlated data. Finally, the method may include sending the one or more risk event predictions to one or more user devices for display.

Disclosed embodiments may include a system for generating predictive risk outcomes for proactive risk management. The method may include receiving input data comprising event data; generating, using a first MLM, associated data from the input data. The method may also include generating, using a second MLM, correlated data and non-correlated data based on the associated data. The method may also include generating, using a third MLM, one or more risk event predictions based on the correlated data and non-correlated data. For example, the method may include sending the risk event predictions to a user device for display on a graphical user interface (GUI). The method may include determining an index of risk event predictions. For instance, the method may include sorting the risk event predictions by the index of risk event predictions. Finally, the method may include changing the GUI dynamically in response to the index of risk event predictions.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure relate to systems and methods for generating predictive outcomes enabling proactive risk management. More particularly, the disclosed technology relates to identifying conditions in historical data leading up to a risk event and analyzing current data to identify similar trends. This involves aggregating and normalizing large quantities of data, recognizing connections between the data, and using predictive classification to determine what the data could mean for the future. The systems and methods described herein are necessarily rooted in computer and technology as they relate to dynamically determining risk event predictions from an aggregate of input data. In some instances, the system utilizes machine learning models to aggregate the data, reduce and filter the data, and generate risk event predictions based on the data. Machine learning models are a unique computer technology that involves training the models to complete tasks, such as labeling, categorizing, or determining which risks are important. Importantly, examples of the present disclosure improve the speed with which computers can determine risks and allows risk management to be conducted in near real-time, unlike current methods which rely heavily on lagging indicators. This allows for proactive action to be taken, when advised of risk, before the risk grows to become more serious (e.g., realized loss events), rather than waiting for the risk to materialize into an actual problem. This is a significant advantage because the system helps to find potential future risk events and predict their likelihood and severity more quickly than prior systems to prevent similar events from occurring in the future, which provides the system with enhanced capabilities for identifying risk compared to prior systems. Furthermore, the system receives and processes significantly more types of data to provide a more comprehensive risk assessment on an appreciably faster timeframe compared to prior systems.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
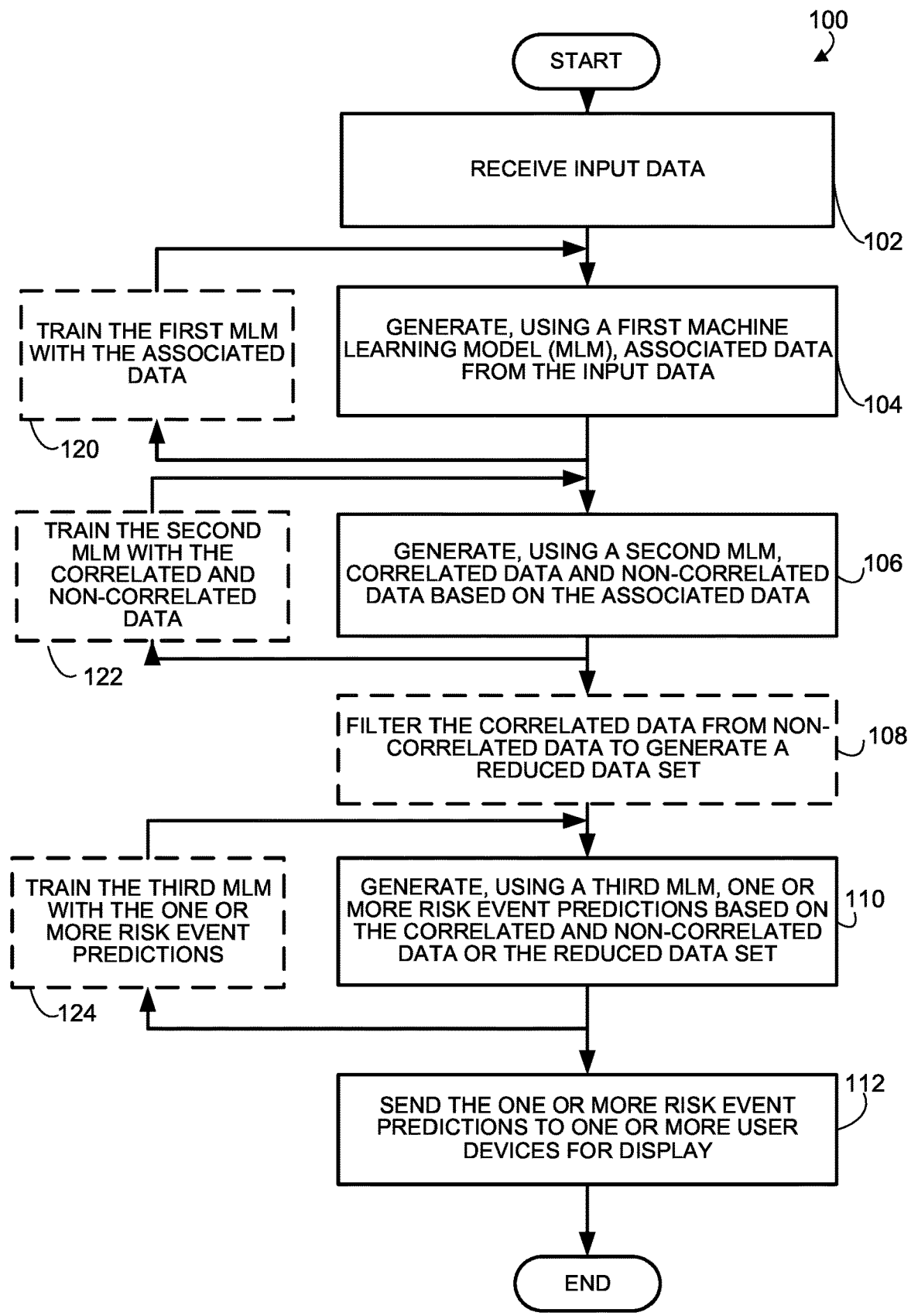
FIG. 1 is a flow diagram illustrating an exemplary method for generating predictive risk outcomes for proactive risk management in accordance with certain embodiments of the disclosed technology.

FIG. 1 is a flow diagram illustrating an exemplary method 100 for predictive outcomes enabling proactive risk management, in accordance with certain embodiments of the disclosed technology. The steps of method 100 may be performed by one or more components of the system 400 (e.g., risk identification system 320 or web server 410 of risk management system 408 or user device 402), as described in more detail with respect to FIGS. 3 and 4.

In block 102, the risk identification system 320 may receive input data. The input data may include assessments, regulatory requirements, metrics, key indicators, issues (e.g., misconfigured technology infrastructure, for example an inoperative merchant credit card reader), events (e.g., a data breach, for example a credit card theft), internal loss data, external loss data, or scenario analysis and the associated attributes and metadata. The input data may also include event data.

In block 104, the risk identification system 320 may use a first MLM to analyze the input data and create associated data. The MLMs of risk identification system 320 may include supervised or unsupervised training through regression models, decision trees (e.g., random forests), neural networks, support-vector machines, and Bayesian networks. Initial and further training may occur through the use of model training inputs (e.g., past examples of risk events). The first MLM may be a supervised neural network leveraging pre-existing expert knowledge, utilizing cosine similarity to assign levels of similarity and dissimilarity to data for clustering above a certain threshold defined in the training of the model. In block 104, the risk identification system 320 may identify linkages within the input data. Input data may be separated into different clusters based on input data source. The risk identification system 320 may identify linkages between different clusters of data. This may be done through a variety of methods. For example, the input data may be aggregated, homogenized, normalized, and/or standardized. The associated data may be created by using natural language processing (NLP) (e.g., lexical semantics) to relate the input data with a risk theme. A risk theme may be a collection of risks that focus around a specific potential problem (e.g., cybersecurity risk of data leakage due to misconfigured technology infrastructure, for example credit card fraud due to tampered card readers). Risk themes may be specific (e.g., data leakage through file exchange gateways, for example credit card fraud using tampered card readers) and/or general (e.g., cybersecurity risk). Input data may be associated with multiple risk themes (e.g., credit card fraud and cybersecurity risk). The risk identification system 320 may also include storing the associated data or other refined metadata. The associated data may be used to train the first MLM in conjunction with block 120. The output of the first MLM may be used to assess general data quality.

In block 106, the risk identification system 320 may use a second MLM to generate correlated data and non-correlated data. The second MLM may be a supervised neural network trained initially leveraging pre-existing expert knowledge and chronological sequencing of historical data against historical issues and events. The risk identification system 320 may determine what data is valuable and which clusters of data are valuable for determining risk. The correlated data may be based on the associated data and/or other event data. The second MLM may use a stochastic correlation approach for establishing linkages between historical events and issues with the associated data to identify previously hidden ambiguous inter-relationships while reducing the overall volume of the data set to meaningful information. The second MLM may include a custom algorithm running within an MLM. The custom algorithm may include a stochastic correlation algorithm that can identify new, previously unknown, associations (positive and negative) with the output indicating the data's associative usefulness at informing on potential events and issues. Data may be tagged by degree of positive or negative correlation for utilization in downstream analysis in blocks 108 or 110. Highly uncorrelated data may be segmented out and utilized as feedback to experts to refine and improve the data used as inputs. Risk identification system 320 may also be able to supply metric performance data for inventory reviews at this stage or evaluate the performance of other risk metrics (e.g., operational losses as a percentage of revenue, technology system uptime percentage, volume of application security vulnerabilities). This would allow the user to determine which metrics are valuable and which are expendable. The correlated and non-correlated data may be used to train the second MLM.

In block 108, the risk identification system 320 may filter the correlated data from the non-correlated data to generate a reduced data set. The reduced data set may be used to further enhance metric performance data. Block 108 may be optional. If block 108 is optional, the correlated and non-correlated data could be used directly as inputs to the third MLM.

In block 110, the risk identification system 320 may use a third MLM to generate risk event predictions based on the reduced data set. In block 110, the risk identification system 320 may scan the reduced data set to predict if current activities are going to become a risk moving forward based on past data. This may include determining which pieces of data in the reduced data set can produce risk events that are problematic-enough to rise to a certain predetermined threshold of risk through predictive classification. This may be achieved using Naïve Bayesian supervised learning which assigns probabilistic attributes to the refined, highly correlated reduced data set to determine the likelihood of a future event occurring based upon what has already occurred. This may occur at a high overview level or down to an individual risk level. The risk event predictions may be used to train the third MLM in block 110. The risk event predictions may be precise or apply to a range, may contain risk attributes (e.g., likelihood, severity, size, risk directions), an event horizon timeframe (e.g., within 3 months), the customers impacted, loss impact categories (operational, compliance, reputational, financial), and may provide suggestions.

In block 112, the risk identification system 320 may send the risk event predictions to a user device 402 for display. Here, the user device 402 may display the attributes of the risk event predictions to the user and indicate if a certain risk is greater than or less than a predetermined threshold value of risk. Put another way, the risk identification system 320 may cause the user device 402 to display the attributes of the risk event predictions to the user and indicate if a certain risk is greater than or less than a predetermined threshold value of risk. This predetermined threshold may be specific to an aggregated amount that accounts for the combination of multiple or all risk event predictions (e.g., entire risk portfolio) or may be specific to the individual amount of a single risk event prediction (e.g., single event). The user device 402 may be able to show the accuracy of other reporting metrics. The risk identification may be able to store analytical outcomes and main contain templates to output using existing reporting processes and forms.

In optional block 120, the risk identification system 320 may use the associated data output from block 104 to teach the first MLM. This may be completed by using model training inputs created from the associated data and expert judgment to periodically refine test and validation data sets and confirm results. Training may also be used to maintain model performance.

In optional block 122, the risk identification system 320 may use the correlated and non-correlated data output from block 106 to teach the second MLM. This may be completed by using model training inputs created from the correlated and non-correlated data and expert judgment to periodically refine test and validation data sets and confirm results. Training may also be used to maintain model performance.

In optional block 124, the risk identification system 320 may use the risk event predictions output from block 110 to teach the third MLM. This may be completed by using model training inputs created from the risk event predictions and expert judgment to periodically refine test and validation data sets and confirm results. Training may also be used to maintain model performance.

The first, second, and third MLMs may be embodied in one MLM. This may be completed by using a single MLM with different algorithms for each of the steps recited in blocks 104, 106, and 110. In such an embodiment, the flow and alteration of data would effectively be the same as illustrated by FIG. 1.

Figure 2:
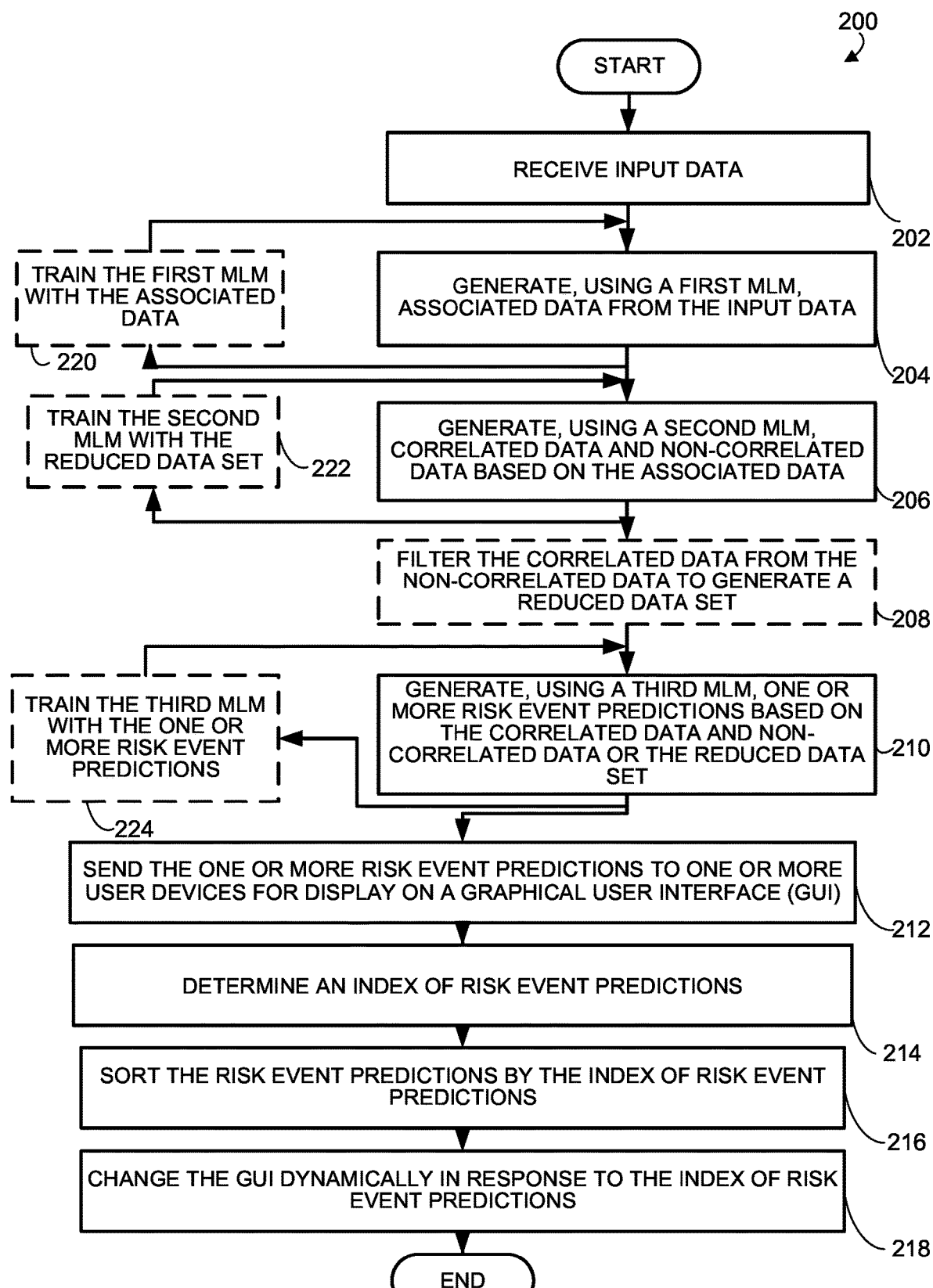
FIG. 2 is a flow diagram illustrating an exemplary method for generating predictive risk outcomes enabling proactive risk management in accordance with certain embodiments of the disclosed technology.

FIG. 2 is a flow diagram illustrating an exemplary method 100 for predictive outcomes enabling proactive risk management, in accordance with certain embodiments of the disclosed technology. The steps of method 200 may be performed by one or more components of the system 400 (e.g., risk identification system 320 or web server 410 of risk management system 408 or user device 402), as described in more detail with respect to FIGS. 3 and 4.

Method 200 of FIG. 2 is similar to method 100 of FIG. 1, except that method 100 may not include blocks 212, 214, 216, and 218 of method 200. The descriptions of blocks 202, 204, 206, 208, 210, 220, 222, and 224 in method 200 are similar to the respective descriptions of blocks 102, 104, 106, 108, 110, 120, 122, and 124 of method 100 and are not repeated herein for brevity. However, block 212 is different from block 112 and is described below. Additional blocks 214, 216, and 218 are also described below.

In block 212, the risk identification system 320 may send the risk event predictions to a user device 402 for display on an interactive and dynamic graphical user interface (GUI). The GUI may incorporate all features discussed in block 112 and add additional features. The GUI may allow the user to change the data selection used by risk identification system 320. The GUI may allow the user to modify, associate and disassociate, and correlate and de-correlate certain pieces of data used in the calculations by the risk identification system 320. The GUI may highlight certain pieces of data that are relevant to generating risk event predictions or reorder icons referring to the risk event predictions dynamically in response to a change in the data or by sorting method. For example, the user may select to run the risk identification system 320 with data from the last four weeks. The risk identification system 320 would then display the risk event predictions based on the four-week data. If the user then chose to re-run the risk identification system 320 with data from the last eight weeks, the risk identification system 320 would change the order or highlighting of the risk event predictions accordingly. The GUI may allow the user to modify the training models for the individual MLMs. Thus, the GUI may also allow the user to modify the data used to train the first MLM from the associated data (220), the reduced data set (222), or the risk event predictions (224). The user's selection of certain data points may be used to train any of the MLMs in risk identification system 320. The GUI may change dynamically in response to the user modifying values. For example, if the user excludes a piece of data from the analysis, the risk identification system 320 may re-analyze the data according to method 100. The GUI may then show changes between the first run (prior to the data exclusion) and the second run (with the data exclusion) or may reorder the risk event predictions according to change. The GUI may also allow the user to re-run the risk identification system 320 from the start to see if different risk event predictions are created when the data selection or MLM training is changed by the user. The GUI may display the estimated loss value associated with the risk event prediction. Other results displayed by the GUI may include a combination of factors and data, correlation, likelihood of occurrence range, estimated event horizon window, losses in different currency amounts (inclusive of all loss impact categories), and customers impacted.

In block 214, the risk identification system 320 may determine an index of risk event predictions by listing all the risk event predictions, their relevant reduced data sets, associated data, and input data, and the risks identification system's 320 reasoning for the prediction. This index may contain all the risk event predictions that the risk identification system 320 determines are relevant or potentially problematic.

In block 216, the risk identification system 320 may sort the risk event predictions by the index. The sorting of the risk event predictions may be in order of decreasing or increasing severity (e.g., threshold values related to how bad the event is to the overall risk portfolio, public opinion, company value or other metrics), loss value (e.g., as a currency amount), duration (e.g., estimation of how long until this event occurs or how long the event would last), trend direction (e.g., if recent data is showing that this event is more or less likely to occur), likelihood (e.g., an approximate percentage), drivers or causal drivers, impacts or impact categories (e.g., compliance, reputational, operational, financial), specific metrics or value ranges (e.g., sort results specific to fraud loss as a percent of revenue or as a range), among other factors.

In block 218, the risk identification system 320 may change the GUI dynamically in response to the index of risk event predictions. The index and sort of the risk event predictions displayed may change on the GUI in response to the user changing data selection points. The changes made by the user may be reflected on the GUI in near-real time. If the risk identification system 320 is setup to constantly receive input data in real time, the GUI may constantly change to highlight or put the most pressing risk event predictions on the top of the risk event prediction index. The GUI may present the risk event predictions according to certain time constraints (e.g., one month, one quarter, one year). The GUI may include programs (scripts, functions, algorithms) to configure data for visualizations and provide visualizations of datasets and data models on the user device 402. This may include programs to generate graphs and display graphs. The GUI may include programs to generate histograms, scatter plots, box and whisker plots, time series, or the like on the user device 402. The GUI may also be configured to display properties of data models and data model training results including, for example, architecture, loss functions, cross entropy, activation function values, embedding layer structure and/or outputs, convolution results, node outputs, or the like on the user device 402.

Figure 3:
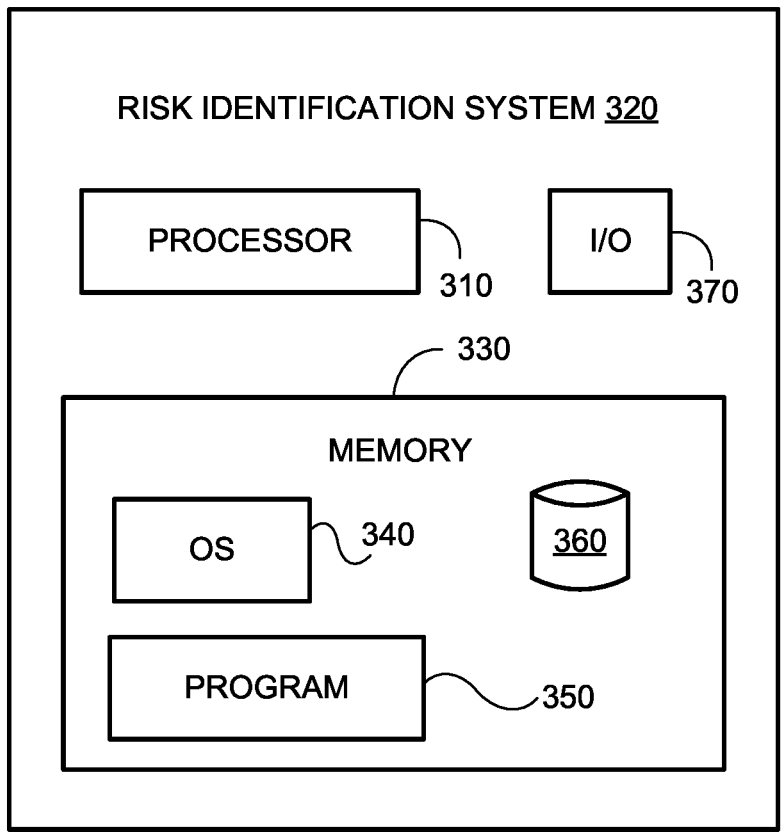
FIG. 3 is block diagram of an example risk identification system used to enable proactive risk management, according to an example implementation of the disclosed technology.
Figure 4:
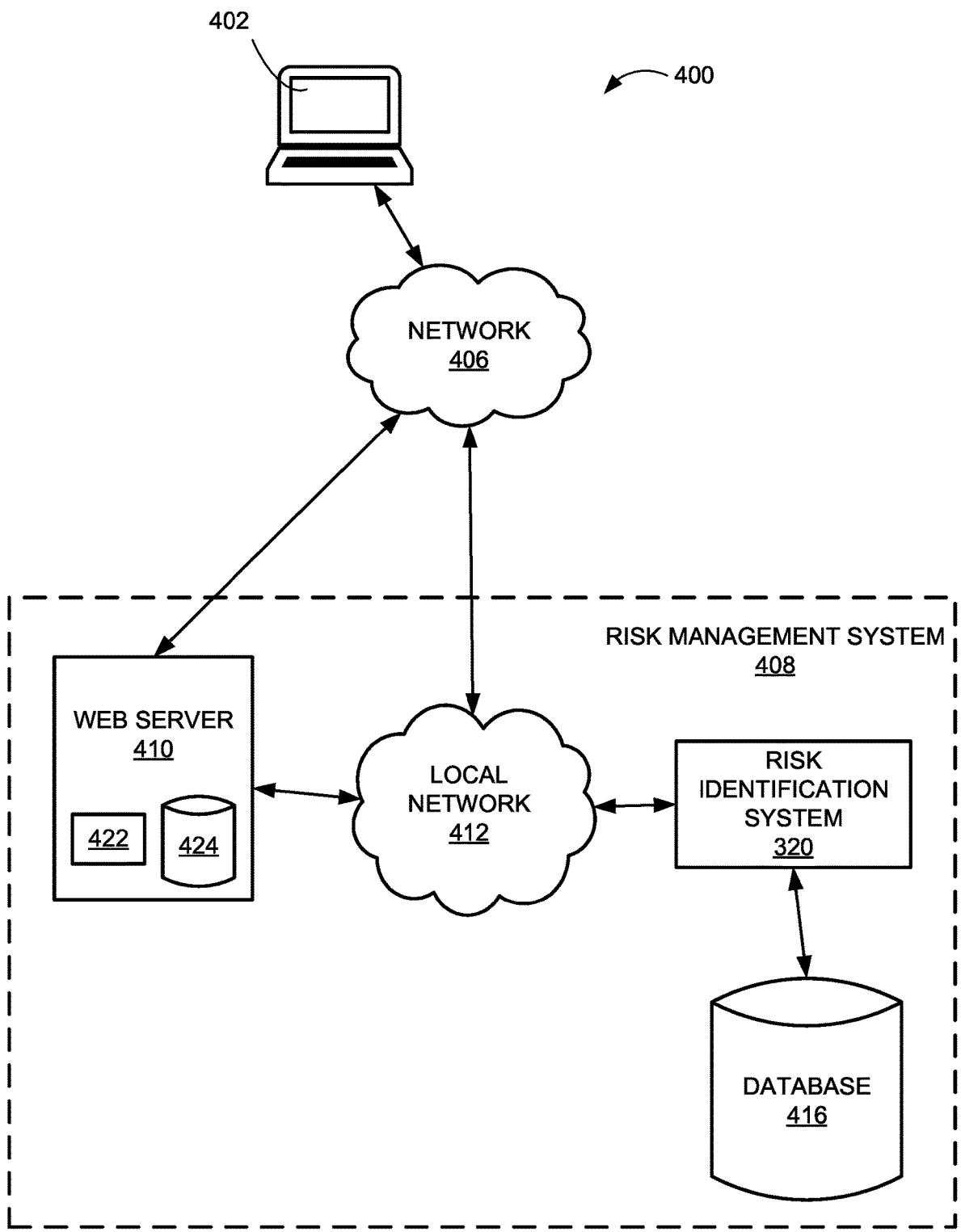
FIG. 4 is block diagram of an example system that may be used to facilitate proactive risk management, according to an example implementation of the disclosed technology.

FIG. 3 is a block diagram of an example risk identification system 320 used to determine the sentiment of a user and generate the appropriate response to the sentiment according to an example implementation of the disclosed technology. According to some embodiments, the user device 402 and web server 410, as depicted in FIG. 4 and described below, may have a similar structure and components that are similar to those described with respect to risk identification system 320 shown in FIG. 3. As shown, the risk identification system 320 may include a processor 310, an input/output ("I/O") device 370, a memory 330 containing an operating system ("OS") 340 and a program 350. In certain example implementations, the risk identification system 320 may be a single server or may be configured as a distributed computer system including multiple servers or computers that interoperate to perform one or more of the processes and functionalities associated with the disclosed embodiments. In some embodiments risk identification system 320 may be one or more servers from a serverless or scaling server system. In some embodiments, the risk identification system 320 may further include a peripheral interface, a transceiver, a mobile network interface in communication with the processor 310, a bus configured to facilitate communication between the various components of the risk identification system 320, and a power source configured to power one or more components of the risk identification system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Pentium™ family manufactured by Intel™ or the Turion™ family manufactured by AMD™. The processor 310 may constitute a single core or multiple core processor that executes parallel processes simultaneously. For example, the processor 310 may be a single core processor that is configured with virtual processing technologies. In certain embodiments, the processor 310 may use logical processors to simultaneously execute and control multiple processes. The processor 310 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the risk identification system 320 may include one or more storage devices configured to store information used by the processor 310 (or other components) to perform certain functions related to the disclosed embodiments. In one example, the risk identification system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the risk identification system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the risk identification system 320 may include the memory 330 that may include one or more programs 350 to perform one or more functions of the disclosed embodiments. For example, in some embodiments, the risk identification system 320 may additionally manage dialogue and/or other interactions with the customer via a program 350.

The processor 310 may execute one or more programs located remotely from the risk identification system 320. For example, the risk identification system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a risk event database 360 for storing related data to enable the risk identification system 320 to perform one or more of the processes and functionalities associated with the disclosed embodiments.

The risk event database 360 may include stored data relating to status data (e.g., average session duration data, location data, idle time between sessions, and/or average idle time between sessions) and historical status data. According to some embodiments, the functions provided by the risk event database 360 may also be provided by a database that is external to the risk identification system 320, such as the database 416 as shown in FIG. 4.

The risk identification system 320 may also be communicatively connected to one or more memory devices (e.g., databases) locally or through a network. The remote memory devices may be configured to store information and may be accessed and/or managed by the risk identification system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The risk identification system 320 may also include one or more I/O devices 370 that may comprise one or more interfaces for receiving signals or input from devices and providing signals or output to one or more devices that allow data to be received and/or transmitted by the risk identification system 320. For example, the risk identification system 320 may include interface components, which may provide interfaces to one or more input devices, such as one or more keyboards, mouse devices, touch screens, track pads, trackballs, scroll wheels, digital cameras, microphones, sensors, and the like, that enable the risk identification system 320 to receive data from a user (such as, for example, via the user device 402).

In example embodiments of the disclosed technology, the risk identification system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the risk identification system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the risk identification system 320 may include a greater or lesser number of components than those illustrated.

FIG. 4 is a block diagram of an example system that may be used to view and interact with risk management system 408, according to an example implementation of the disclosed technology. The components and arrangements shown in FIG. 4 are not intended to limit the disclosed embodiments as the components used to implement the disclosed processes and features may vary. As shown, risk management system 408 may interact with a user device 402 via a network 406. In certain example implementations, the risk management system 408 may include a local network 412, a risk identification system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the risk management system 408. In some embodiments, the user device 402 may include or incorporate electronic communication devices for hearing or vision impaired users.

According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network using a public network, and/or other suitable connection(s) that enable(s) components in the system 400 environment to send and receive information between the components of the system 400. The network 406 may also include a PSTN and/or a wireless network.

The risk management system 408 may be associated with and optionally controlled by one or more entities such as a business, corporation, individual, partnership, or any other entity that provides one or more of goods, services, and consultations to individuals such as customers. In some embodiments, the risk management system 408 may be controlled by a third party on behalf of another business, corporation, individual, partnership. The risk management system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the risk identification system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™ Ethernet, and other suitable network connections that enable components of the risk management system 408 to interact with one another and to connect to the network 406 for interacting with components in the system 400 environment. In some embodiments, the local network 412 may include an interface for communicating with or linking to the network 406. In other embodiments, certain components of the risk management system 408 may communicate via the network 406, without a separate local network 406.

The risk management system 408 may be hosted in a cloud computing environment (not shown). The cloud computing environment may provide software, data access, data storage, and computation. Furthermore, the cloud computing environment may include resources such as applications (apps), virtual machines (VM), virtualized storage (VS), or hypervisors (HYP). User device 402 may be able to access risk management system 408 using the cloud computing environment. User device 402 may be able to access risk management system 408 using specialized software. The cloud computing environment may eliminate the need to install specialized software on user device 402.

In accordance with certain example implementations of the disclosed technology, the risk management system 408 may include one or more computer systems configured to compile data from a plurality of sources the risk identification system 320, web server 410, and/or the database 416. The risk identification system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Although the preceding description describes various functions of a web server 410, a risk identification system 320, and a database 416 in some embodiments, some or all of these functions may be carried out by a single computing device.

Example Use Case

The following example use case describes an example of a typical user flow pattern. This section is intended solely for explanatory purposes and not in limitation.

In one example, data regarding a plethora of credit card transactions is received by risk identification system 320. The first MLM generates associated data including several thousand batches of malicious credit card charges from the input data. The associated data consists of transaction information that is deemed to be a potential risk based on the perceptions of the first MLM. The second MLM tags the data such that certain transactions using the same credit card reader are correlated to one another and other transactions are not correlated (e.g., transactions from a different type of credit card reader). At block 208, the correlated data, the certain correlated transactions, are separated from the non-correlated transactions. The certain correlated transactions now constitute the reduced data set. The third MLM analyzes the reduced data set containing a reduced amount of correlated transactions to determine that five such transactions are indicative of larger problems with the security of credit card readers and creates three risk event predictions. The risk event predictions corresponding to the aforementioned transactions are sent to the user device for display on the GUI. The risk identification system 320 then determines an index of the three risk event predictions and then sorts the risk event predictions according to loss value. The GUI then changes to rank the risk event predictions based on the severity of the loss value.

The user then modifies the values used in the data for one of the three risk prediction and then re-runs the risk identification system 320. The first MLM reevaluates the input data to generate new associated data from the input data. Since the first MLM has been trained using the prior associated data (220), it now identifies different transactions in the associated data set. Subsequently, the second and third MLMs reevaluate the data. Therefore, the new selection reveals six risk event predictions with a different loss value.

In another example, data regarding a plethora of operational risk data and metrics is received by risk identification system 320. The first MLM generates associated data identifying metadata enabling the classification of input risk and metric data into clusters including several thousand batches of malicious credit card charges from the input data. The associated data consists of clusters of thousands of various risk and metric data points (e.g., human capital, technology change management, and cybersecurity related) deemed to be a potential risk based on the perceptions of the first MLM. The second MLM tags the data such that certain risk data and metric performance data occur around historical issues and events and can be further classified as correlated indicators or not for the proximal event or issue being analyzed. At block 208, the correlated data, the certain correlated risk attributes and metric performance data, are separated from the non-correlated data. The certain correlated risk and metric performance data now constitute the reduced data set. The third MLM analyzes the reduced data set containing a reduced amount of correlated human capital, technology management, and cybersecurity risk data and metrics to determine a scenario where whenever technology management risks have controls that are less than fully effective, and human capital and cybersecurity performance metrics have at least one key risk indicator exceeding thresholds, then the likelihood of a cyber event increases. The system then creates risk and time sloped predictions (e.g., a high probability (>67 percent) of a cybersecurity event in the next 12-24 months impacting at least 1 million customers with gross losses exceeding 250 million dollars across operational, financial, reputational, and compliance impacts). The risk event predictions corresponding to the aforementioned transactions are sent to the user device for display on the GUI. The user can interact with the risk event prediction via the charts, graphs, and data presented on the GUI. The user then modifies the values used in the data and re-runs the risk identification system 320. The first MLM reevaluates the input data to generate new associated data from the input data. Since the first MLM has been trained using the prior associated data (220), it now identifies different risks and metric performance data in the associated data set. Subsequently, the second and third MLMs reevaluate the data. Therefore, the new selection reveals different event predictions with a different loss value.

In some examples, disclosed systems or methods may involve one or more of the following clauses:

Clause 1: A method of proactively managing risk, the method comprising: receiving input data comprising event data; generating, using a first MLM, associated data from the input data; generating, using a second MLM, correlated data and non-correlated data based on the associated data and the event data; generating, using a third MLM, one or more risk event predictions based on the correlated data and non-correlated data; sending the one or more risk event predictions to one or more user devices for display; and training the first MLM with the associated data.

Clause 2: The method of clause 1, wherein generating the associated data from the input data further comprises relating the associated data with a risk theme.

Clause 3: The method of clause 2, wherein generating the associated data from the input data further comprises using natural language processing (NLP) to relate the associated data with the risk theme.

Clause 4: The method of clause 1, further comprising normalizing the associated data.

Clause 5: The method of clause 1, wherein generating the correlated data further comprises measuring a performance of metrics.

Clause 6: The method of clause 1, wherein generating the risk event predictions based on the correlated data and non-correlated data further comprises extrapolating the risk event predictions based on the correlated data.

Clause 7: The method of clause 1, wherein the input data comprise an assessment, a key indicator, an issue, an event, internal loss data, external loss data, scenario analysis, regulatory requirements, metrics, attributes, metadata, or combinations thereof.

Clause 8: The method of clause 1, further comprising training the second MLM with the correlated data and non-correlated data.

Clause 9: The method of clause 1, further comprising training the third MLM with the one or more risk event predictions.

Clause 10: A method of proactively managing risk, the method comprising: receiving input data comprising event data; generating, using a first MLM, associated data from the input data; generating, using a second MLM, correlated data and non-correlated data based on the associated data; generating, using a third MLM, one or more risk event predictions based on the correlated data and non-correlated data and sending the one or more risk event predictions to one or more user devices for display.

Clause 11: The method of clause 10, further comprising training the second MLM with the correlated data and non-correlated data.

Clause 12: The method of clause 10, further comprising training the third MLM with the risk event predictions.

Clause 13: The method of clause 10, wherein the risk event predictions are found using Bayesian supervised learning.

Clause 14: The method of clause 10, further comprising predicting future loss value based on the one or more risk event predictions.

Clause 15: The method of clause 10, wherein the risk event predictions are completed contemporaneously with receiving the input data.

Clause 16: A method of proactively managing risk, the method comprising: receiving input data comprising event data; generating, using a first MLM, associated data from the input data; generating, using a second MLM, correlated data and non-correlated data based on the associated data; generating, using a third MLM, one or more risk event predictions based on the correlated data and non-correlated data; sending the risk event predictions to a user device for display on a graphical user interface (GUI); determining an index of risk event predictions; sorting the risk event predictions by the index of risk event predictions; and changing the GUI dynamically in response to the index of risk event predictions.

Clause 17: The method of clause 16, further comprising training the third MLM with the risk event predictions.

Clause 18: The method of clause 16, wherein the index of risk event predictions is a severity index.

Clause 19: The method of clause 16, further comprising: receiving, via the GUI, a first user input indicative of selecting a portion of the correlated data; generating, using the third MLM, one or more updated risk event predictions based on the portion of the correlated data; and sending the updated event predictions to the user device for display on the GUI.

Clause 20: The method of clause 16, further comprising training the second MLM with the correlated data and non-correlated data.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of proactively managing risk, the method comprising:
   receiving input data comprising event data;
   generating, using a first machine learning model (MLM), associated data from the input data by assigning one or more levels of similarity to the input data above a first threshold;
   generating, using a second MLM, correlated data and non-correlated data based on the associated data and the event data by establishing one or more linkages between the event data and the associated data using a custom algorithm operating within the second MLM;
   generating, using a third MLM, one or more risk event predictions based on at least the correlated data by assigning probabilistic attributes to the correlated data;
   transmitting the one or more risk event predictions to one or more user devices for display via a graphical user interface (GUI);
   receiving user input associated with the one or more risk event predictions from the one or more user devices via the GUI;
   training the first MLM with at least the associated data and the user input to modify the first threshold;
   updating the one or more risk event predictions by:
      generating updated associated data with the first MLM based on the modified first threshold;
      generating updated correlated data with the second MLM based on the updated associated data;
      generating one or more updated risk event predictions with the third MLM based on the updated correlated data; and
   transmitting the one or more updated risk event predictions to the one or more user devices for display via an updated GUI.

2. The method of claim 1, wherein:
   generating the associated data from the input data further comprises relating the associated data with a risk theme,
   the first MLM utilizes cosine similarity to assign the one or more levels of similarity to the input data above the first threshold,
   the custom algorithm operating within the second MLM is a stochastic correlation algorithm, and generating the one or more risk event predictions further comprises determining whether the probabilistic attributes are above a second threshold.

3. The method of claim 2, wherein generating the associated data from the input data further comprises using natural language processing (NLP) to relate the associated data with the risk theme.

4. The method of claim 1, further comprising normalizing the associated data, and wherein:
the first MLM is a first supervised neural network,
the second MLM is a second supervised neural network,
the third MLM utilizes Naïve Bayesian supervised learning, and
the first MLM, second MLM, and third MLM are separate and distinct from one another.

5. The method of claim 1, wherein generating the correlated data further comprises measuring a performance of metrics.

6. The method of claim 1, wherein generating the risk event predictions based on the correlated data and non-correlated data further comprises extrapolating the risk event predictions based on the correlated data.

7. The method of claim 1, wherein the input data comprise an assessment, a key indicator, an issue, an event, internal loss data, external loss data, scenario analysis, regulatory requirements, metrics, attributes, metadata, or combinations thereof.

8. The method of claim 1, further comprising training the second MLM with correlated data and non-correlated data.

9. The method of claim 1, further comprising training the third MLM with the one or more risk event predictions.

* * * * *